United States Patent
Ogawa et al.

(10) Patent No.: US 11,412,733 B2
(45) Date of Patent: Aug. 16, 2022

(54) METHOD FOR ENHANCING PLANT DISEASE CONTROLLING EFFECTS OF ISOFETAMID AND METHOD FOR CONTROLLING PLANT DISEASES

(71) Applicant: ISHIHARA SANGYO KAISHA, LTD., Osaka (JP)

(72) Inventors: Munekazu Ogawa, Osaka (JP); Hiroyuki Hayashi, Osaka (JP); Yuzuka Abe, Osaka (JP); Akihiro Nishimura, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 0 days.

(21) Appl. No.: 16/079,901

(22) PCT Filed: Mar. 7, 2017

(86) PCT No.: PCT/JP2017/009004
§ 371 (c)(1),
(2) Date: Aug. 24, 2018

(87) PCT Pub. No.: WO2017/154905
PCT Pub. Date: Sep. 14, 2017

(65) Prior Publication Data
US 2019/0053485 A1    Feb. 21, 2019

(30) Foreign Application Priority Data
Mar. 7, 2016 (JP) .............................. JP2016-043197

(51) Int. Cl.
*A01N 25/30* (2006.01)
*A01N 25/00* (2006.01)
*A01N 43/10* (2006.01)

(52) U.S. Cl.
CPC ............. *A01N 25/30* (2013.01); *A01N 25/00* (2013.01); *A01N 43/10* (2013.01)

(58) Field of Classification Search
CPC ........ A01N 25/30; A01N 25/00; A01N 43/10; A01G 7/06
See application file for complete search history.

(56) References Cited

U.S. PATENT DOCUMENTS

| 7,829,501 | B2 | 11/2010 | Nakamura et al. |
| 8,039,420 | B2 | 10/2011 | Nakamura et al. |
| 8,568,755 | B2 | 10/2013 | Mitani et al. |
| 9,848,601 | B2 | 12/2017 | Morita et al. |
| 9,974,305 | B2 | 5/2018 | Kuwahara et al. |
| 2008/0318779 | A1 | 12/2008 | Nakamura et al. |
| 2010/0255116 | A1 | 10/2010 | Mitani et al. |
| 2010/0261675 | A1 | 10/2010 | Nakamura et al. |
| 2010/0261735 | A1 | 10/2010 | Nakamura et al. |
| 2011/0028521 | A1 | 2/2011 | Morita et al. |
| 2015/0201616 | A1* | 7/2015 | Wachendorff-Neumann ............... A01N 43/653 504/100 |
| 2015/0296771 | A1* | 10/2015 | Sano ............... A01N 43/40 514/355 |
| 2016/0286810 | A1 | 10/2016 | Seitz et al. |
| 2017/0094971 | A1 | 4/2017 | Sakurai et al. |
| 2017/0188580 | A1 | 7/2017 | Kuwahara et al. |

FOREIGN PATENT DOCUMENTS

| EP | 2 263 455 A1 | 12/2010 |
| EP | 3 311 668 A1 | 4/2018 |
| EP | 3 443 842 A1 | 2/2019 |
| KR | 2011-0004386 A | 1/2011 |
| WO | 2006/016708 A1 | 2/2006 |
| WO | 2009/060734 A2 | 5/2009 |
| WO | 2014/079789 A1 | 5/2014 |
| WO | 2015/119246 A1 | 8/2015 |
| WO | 2015/141867 A1 | 9/2015 |

OTHER PUBLICATIONS

Piqueras, Effectiveness of isofetamid, a new succinate dehydrogenase inhibitor fungicide, in the control of grapevine gray mold, Cien. Inv. Agr., 2013, 41(3), pp. 365-374. (Year: 2013).*
"The Pesticide Manual", 17th Edition, British Crop Protection Council, pp. 654-655.
International Search Report issued with respect to Patent Application No. PCT/JP2017/009004, dated Apr. 11, 2017.
International Preliminary Report on Patentability issued with respect to Patent Application No. PCT/JP2017/009004, dated Sep. 11, 2018.
Extended European Search Report issued in EP Patent Application No. 17763245.2, dated Oct. 7, 2019.

* cited by examiner

Primary Examiner — Savitha M Rao
Assistant Examiner — Andrew P Lee
(74) Attorney, Agent, or Firm — Greenblum & Bernstein, P.L.C.

(57) ABSTRACT

To provide a method for controlling plant diseases, which enhancing plant disease controlling effects.
A method for controlling plant disease, which comprises applying isofetamid or its salt as a component (a) and at least one component (b) selected from the group consisting of a nonionic surfactant, an anionic surfactant, a cationic surfactant, a vegetable oil, a paraffin and a resin, to plants or to soil where they grow.

6 Claims, No Drawings

METHOD FOR ENHANCING PLANT DISEASE CONTROLLING EFFECTS OF ISOFETAMID AND METHOD FOR CONTROLLING PLANT DISEASES

TECHNICAL FIELD

The present invention relates to a method for remarkably enhancing plant disease controlling effects, particularly penetration effects, curative effects and rainfastness of isofetamid using a component such as a specific surfactant, and a method for controlling plant diseases using a component such as a specific surfactant and isofetamid.

BACKGROUND ART

Patent Document 1 discloses a mixed fungicidal composition containing an acid amide derivative or its salt, including isofetamid which is the active ingredient of the present invention, and other fungicidal compound, as active ingredients. However, it failed to disclose a method for enhancing controlling effects by using isofetamid in combination with a specific surfactant or the like.

Patent Document 2 discloses a fungicidal composition comprising synergistically effective amounts of a carboxylic acid amide derivative or its salt including isofetamid which is the active ingredient of the present invention, and other fungicidal compound. However, it failed to disclose a method for enhancing controlling effects by using isofetamid in combination with a specific surfactant or the like.

PRIOR ART DOCUMENTS

Patent Documents

Patent Document 1: WO2006/016708
Patent Document 2: WO2009/060734

DISCLOSURE OF INVENTION

Technical Problem

Isofetamid which is the active ingredient of the present invention has excellent effects against plant diseases in a wide range, however, its fungicidal effect may be insufficient against specific plant diseases, or it may be inferior in rainfastness, residual effects and curative effects. And, it sometimes has practically no sufficient controlling effects against plant diseases.

The object of the present invention is to use isofetamid in combination with a component such as a specific surfactant to improve penetration effects, curative effects, rainfastness and residual effects thereby to remarkably improve controlling effects against plant diseases.

Solution to Problem

The present inventors have conducted extensive studies to achieve the above objects and as a result, found that by using isofetamid or its salt in combination with an effect-enhancing component consisting of a specific compound, excellent penetration effects, curative effects, rainfastness and residual effects can be obtained, which are unexpected from a case where isofetamid or its salt is used individually, and accomplished the present invention.

That is, the present invention provides a method for enhancing plant disease controlling effects of isofetamid or its salt (hereinafter sometimes referred to simply as a component (a)) by using at least one component (hereinafter sometimes referred to simply as a component (b)) selected from the group consisting of a nonionic surfactant, an anionic surfactant, a cationic surfactant, a vegetable oil, a paraffin and a resin; a method for controlling plant diseases, which comprises applying the component (a) and the component (b) to plants or to soil where they grow; and a composition for controlling plant diseases, which comprises the component (a) and the component (b).

Advantageous Effects of Invention

According to the present invention, by using isofetamid as an active ingredient and a component such as a specific surfactant in combination, penetration effects, curative effects, rainfastness and residual effects are improved, and stably high controlling effects against plant diseases are achieved, and accordingly the present invention is useful for controlling plant diseases.

DESCRIPTION OF EMBODIMENTS

Isofetamid is a compound disclosed in The Pesticide Manual (17th edition, British Crop Protection Council), pages 654 to 655.

Isofetamid may be in a salt form. The salt may be any agriculturally acceptable salt and may, for example, be an alkali metal salt such as a sodium salt or a potassium salt; an alkaline earth metal salt such as a magnesium salt or a calcium salt; an ammonium salt such as a monomethylammonium salt, a dimethylammonium salt or a triethylammonium salt; an inorganic acid salt such as a hydrochloride, a perchlorate, a sulfate or a nitrate; or an organic acid salt such as an acetate, a fumarate or a methanesulfonate.

The component (b) which is at least one member selected from the group consisting of a nonionic surfactant, an anionic surfactant, a cationic surfactant, a vegetable oil, a paraffin and a resin, is used as a component for enhancing effects of isofetamid or its salt.

The nonionic surfactant is preferably at least one surfactant selected from the group consisting of a silicone surfactant, a polyoxyethylene surfactant, a polyhydric alcohol surfactant and an alkanolamide surfactant.

The silicone surfactant may, for example, be polyoxyethylene methylpolysiloxane, polyoxyethylene heptamethyltrisiloxane, polyoxyalkylene oxypropylheptamethyltrisiloxane, polyoxyethylene propylheptamethyltrisiloxane, polyalkylene oxide-modified heptamethyltrisiloxane, polyoxyethylene-modified polydimethylsiloxane, polyalkylene oxide-modified polydimethylsiloxane, polyether siloxane, a polyether/polymethylsiloxane copolymer, a polyether/polydimethylsiloxane copolymer, polyoxyethylene dimethylsiloxane, polyalkylene oxide-modified polymethylsiloxane, polyether-modified polysiloxane or hydroxypropyl heptamethyltrisiloxane.

Among them, preferred is polyether siloxane, polyoxyethylene dimethylsiloxane, polyoxyethylene methylpolysiloxane, polyalkylene oxide-modified polymethylsiloxane, polyoxyethylene propylheptamethyltrisiloxane, polyether-modified polysiloxane, hydroxypropyl heptamethyltrisiloxane, polyalkylene oxide-modified heptamethyltrisiloxane or a polyether/polymethylsiloxane copolymer.

Specific examples of commercial silicone surfactants include polyether siloxane (Break-Thru OE441, manufactured by EVONIC), polyoxyethylene dimethylsiloxane (Dyne-Amic (a mixture with methylated seed oil, manufactured by Helena), polyoxyethylene methylpolysiloxane (KF-64, manufactured by Shin-Etsu Chemical Co., Ltd., Makupikal, manufactured by Ishihara Sangyo Kaisha, Ltd.), polyalkylene oxide-modified polymethylsiloxane (Kinetic, manufactured by Helena), polyoxyethylene propylheptamethyltrisiloxane (Masil SF1, manufactured by Emerald), polyether-modified polysiloxane (Quark (a mixture with a nonionic surfactant), manufactured by Simplot), hydroxypropyl heptamethyltrisiloxane (Silglow (a mixture with a nonionic surfactant), manufactured by Britz), polyalkylene oxide-modified heptamethyltrisiloxane (Silwet L77 (a mixture with allyloxypolyethylene glycol methyl ether), manufactured by Helena, Slippa (a mixture with a linear alcohol surfactant), manufactured by Interagro (UK) Ltd.), a polyether/polymethylsiloxane copolymer (Syl-Coat, manufactured by Wilbur-Ellis Holdings, Inc.), polyoxyethylene-modified polydimethylsiloxane (XIAMETER, manufactured by Dow), polyoxyalkylene oxypropylheptamethyltrisiloxane (Break-Thru (a mixture with polyoxyalkylene propenyl ether), manufactured by SANKEI CHEMICAL CO., Ltd.).

Among them, preferred is polyether siloxane (Break-Thru OE441, manufactured by EVONIC), polyoxyethylene dimethylsiloxane (Dyne-Amic (a mixture with methylated seed oil, manufactured by Helena), polyoxyethylene methylpolysiloxane (KF-64, manufactured by Shin-Etsu Chemical Co., Ltd., Makupika, manufactured by Ishihara Sangyo Kaisha, Ltd.), polyalkylene oxide-modified polymethylsiloxane (Kinetic, manufactured by Helena), polyoxyethylene propylheptamethyltrisiloxane (Masil SF19, manufactured by Emerald), polyether-modified polysiloxane (Quark (a mixture with a nonionic surfactant), manufactured by Simplot), hydroxypropyl heptamethyltrisiloxane (Silglow (a mixture with a nonionic surfactant), manufactured by Britz), polyalkylene oxide-modified heptamethyltrisiloxane (Silwet L77 (a mixture with allyloxypolyethylene glycol methyl ether) manufactured by Helena) and a polyether/polymethylsiloxane copolymer (Syl-Coat, manufactured by Wilbur-Ellis Holdings, Inc.).

The polyoxyethylene surfactant may, for example, be a polyoxyethylene alkyl phenyl ether; a polyoxyethylene fatty acid ester, formalin condensate of a polyoxyethylene alkyl phenyl ether, a polyoxyethylene alkyl ether, a polyoxyethylene aryl ether, polyoxyethylene (mo-, di- or tri-)phenyl phenyl ether, polyoxyethylene (mono-, di- or tri-)benzyl phenyl ether, polyoxypropylene (mono-, di- or tri-)benzyl phenyl ether, polyoxyethylene (mono-, di- or tri-)styryl phenyl ether, polyoxypropylene (mono-, di- or tri-)styryl phenyl ether, a polymer of polyoxyethylene (mono-, di- or tri-)styryl phenyl ether, a polyoxyethylene/polyoxypropylene block polymer, an alkylpolyoxyethylene/polyoxypropylene block polymer ether, an alkylphenylpolyoxyethylene/polyoxypropylene block polymer ether, a polyoxyethylene bisphenyl ether, a polyoxyethylene resinate, a polyoxyethylene fatty acid amide, an alkylphenoxy polyethoxy ethanol, polyoxyethylene nonylphenoxy ether, a polyoxyethylene alkylamine or a polyoxyethylene rosin ester.

Among them, preferred is a polyoxyethylene alkyl phenyl ether, a polyoxyethylene fatty acid ester, a polyoxyethylene alkyl ether or a polyoxyethylene alkylamine.

Specific examples of the polyoxyethylene alkyl phenyl ether include polyoxyethylene nonyl phenyl ether (Alsoap 30, manufactured by Sumitomo Chemical Company, Limited, Agral 90, manufactured by Syngenta), a polyoxyethylene alkyl phenyl ether (ADwet90 (a mixture with diethylene glycol and tall oil fatty acid), manufactured by Simplot, Prime Oil (a mixture with tall oil and paraffin oil), manufactured by WINFIELD UNITED), polyoxyethylene nonyl phenoxy ether (Agra, manufactured by Syngenta), 4-nonylphenyl-polyethylene glycol (Arkopal N100, manufactured by Clariant), octylphenoxypolyethoxyethanol (Citowett, manufactured by BASF), polyoxyethylene nonyl phenol (R-11, manufactured by Wilbur-Ellis Holdings, Inc.), polyoxyethylene octyl phenyl ether (KUSARINO, manufactured by NIHON NOHYAKU CO., LTD.), polyoxyethylene styryl phenyl ether (NOIGEN EA110, manufactured by DKS Co., Ltd.) and a polyoxyethylene alkyl phenyl ether (MIXPOWER (a mixture with a polyoxyethylene alkyl ether), manufactured by Syngenta).

Specific examples of the polyoxyethylene fatty acid ester include a lanolin fatty acid polyethylene glycol ester (RAMIGEN ES-7, manufactured by DKS Co., Ltd.), a polyoxyethylene C16-C18 fatty acid ester (Emulan PS70, manufactured by BASF), a polyoxyethylene resinate (KK Sticker, manufactured by ACRO-KANESHO CO., LTD., SQUASH (a mixture with a sorbitan fatty acid ester), manufactured by KAO Corporation), and a polyoxyethylene fatty acid ester (NOIGEN ET-120E, manufactured by DKS Co., Ltd.).

Specific examples of the polyoxyethylene alkylamine include polyoxyethylene oleylamine (PIONIN D-3605, manufactured by TAKEMOTO OIL & FAT Co., Ltd.)

Specific examples of the polyoxyethylene alkyl ether include polyoxyethylene tridecyl ether (NOIGEN TDS-70, manufactured by DKS Co., Ltd.), an alkyl aryl polyoxyalkene ether (Induc, manufactured by Helena), tall oil fatty acid methyl ester N,N-Bis2-omega-hydroxypolyoxyethylene alkylamine (Entry, manufactured by Simplot).

Among them, preferred is a polyoxyethylene alkyl phenyl ether (ADwet90 (a mixture with diethylene glycol and tall oil fatty acid), manufactured by Simplot, Prime Oil (a mixture with tall oil and paraffin oil), manufactured by WINFIELD UNITED), polyoxyethylene nonylphenol (R-11, manufactured by Wilbur-Ellis Holdings, Inc.), a polyoxyethylene C16-C18 fatty acid ester (Emulan PS700, manufactured by BASF), an alkyl aryl polyoxyalkylene ether (Induce, manufactured by Helena), a polyoxyethylene resinate (SQUASH (a mixture with a sorbitan fatty acid ester), manufactured by KAO Corporation) and tall oil fatty acid methyl ester N,N-Bis2-omega-hydroxypolyoxyethylene alkylamine (Entry, manufactured by Simplot).

The polyhydric alcohol surfactant may, for example, be a polyoxyethylenehexitan fatty acid ester, a sorbitan fatty acid ester, a polyoxyethylene sorbitan fatty acid ester, a polyethylene glycol fatty acid ester or a polyhydric alcohol fatty acid ester, or an ethylene oxide adduct thereof, a sucrose fatty acid ester, a castor oil ethylene oxide adduct, a hydrogenated castor oil ethylene oxide adduct, an alkylamine ethylene oxide adduct or a fatty acid amide ethylene oxide adduct.

Among them, preferred is a sorbitan fatty acid ester, a polyethylene glycol fatty acid ester or a polyhydric alcohol fatty acid ester, or an ethylene oxide adduct thereof.

Specific examples of the polyhydric alcohol surfactant include a polyoxyethylenehexitan fatty acid ester (Aproach BI, manufactured by MARUWA BIOCHEMICAL Co., Ltd.), a polyoxyethylene sorbitan fatty acid ester (Tween20, manufactured by Wako Pure Chemical Industries, Ltd.), a sorbitan fatty acid ester (SQUASH (a mixture with a polyoxyethylene resinate), manufactured by Kao Corporation, SORGEN40, manufactured by DKS Co., Ltd., Bravo (a mixture with a polyoxyethylene fatty acid ester and dialkyldimethylammonium polynaphthylmethanesulfonate)

manufactured by ACRO-KANESHO CO., LTD.), a castor oil ethylene oxide adduct (D-230, manufactured by TAKEMOTO OIL & FAT Co., Ltd.), a hydrogenated castor oil ethylene oxide adduct (D-230kz, manufactured by TAKEMOTO OIL & FAT Co., Ltd.), polyethylene glycol isotridecyl ester (Genapol X-80, manufactured by Clariant), polyethylene glycol monooleate (Nikkol MYO-10V, manufactured by Nikko Chemicals, Co., Ltd.), polyethylene glycol monostearate (Nikkol MYS-55V, manufactured by Nikko Chemicals, Co., Ltd.), a mixture of a polyhydric alcohol fatty acid ester and a polyhydric alcohol polyethylene oxide fatty acid ester (Agridex (a mixture with paraffin-based petroleum), manufactured by Bayer).

Among them, preferred is a sorbitan fatty acid ester (SQUASH (a mixture with a polyoxyethylene resinate), manufactured by Kao Corporation), polyethylene glycol monooleate (Nikkol MYO-10V, manufactured by Nikko Chemicals, Co., Ltd.), polyethylene glycol monostearate (Nikkol MYS-55V, manufactured by Nikko Chemicals Co., Ltd.) or a mixture of a polyhydric alcohol fatty acid ester and a polyhydric alcohol polyethylene oxide fatty acid ester (Agridex (a mixture with paraffin-based petroleum), manufactured by Bayer).

The alkanolamide surfactant may, for example, be a mixture of ethanolamine and triethanolamine, or an alkyl-alkanolamide.

Among them, preferred is a mixture of ethanolamine and triethanolamine.

Specific examples of the alkanolamide surfactant include an alkanolamide surfactant (a mixture of ethanolamine and triethanolamine) (Cohere (a mixture with a polyoxyethylene alkyl aryl sulfonate and propylene glycol), manufactured by Helena) and an alkylalkanolamide (AMINON PK-02S, manufactured by Kao Corporation).

Among them, preferred is an alkanolamide surfactant (a mixture of ethanolamine and triethanolamine) (Cohere (a mixture with an alkylpolyethoxyethanol sulfate and propylene glycol), manufactured by Helena).

The anionic surfactant may, for example, be a sulfonate surfactant, a sulfate surfactant or a phosphate surfactant, and is preferably a phosphate surfactant.

The sulfonate surfactant may, for example, be a dialkylsulfosuccinic acid; an alkylbenzenesulfonate, an a-olefin sulfonic acid, a polyoxyethylene alkyl phenyl ether sulfonate, a polyoxyethylene alkyl ether sulfosuccinic acid half ester, naphthalene sulfonic acid or an alkylnaphthalenesulfonic acid, dodecylbenzenesulfonic acid diethanolamine, a polyoxyethylene alkyl aryl sulfonate, or a salt thereof.

Specific examples of the sulfonate surfactant include a dialkylsulfosuccinate (New Kalgen EP-70G, manufactured by TAKEMOTO OIL & FAT Co., Ltd., New Kalgen EX-70, manufactured by TAKEMOTO OIL & FAT Co., Ltd.), and a polyoxyethylene alkyl aryl sulfonate (Cohere (a mixture of an alkanolamide surfactant (a mixture of ethanolamine and triethanolamine) and propylene glycol), manufactured by Helena).

Among them, preferred is a polyoxyethylene alkyl aryl sulfonate (Cohere (a mixture of an alkanolamide surfactant (a mixture of ethanolamine and triethanolamine) and propylene glycol), manufactured by Helena).

The sulfate ester surfactant may, for example, be a higher alcohol sulfuric acid ester salt, an alkyl sulfate, a polyoxyethylene alkyl ether sulfate, a polyoxyethylene alkylphenyl ether sulfate, a sulfuric acid ester of a polymer of a polyoxyethylene alkylphenyl ether, a polyoxyethylene benzyl phenyl ether sulfate, a polyoxyethylene styryl phenyl ether sulfate, a sulfuric acid ester of a polymer of polyoxyethylene styryl phenyl ether, a sulfuric acid ester of a polyoxyethylene polyoxypropylene block polymer or a sulfonated olefin, or a salt thereof.

Specific examples of the sulfate surfactant include sodium lauryl sulfate (MONOGEN Y-100, manufactured by DKS Co., Ltd.) and an alkyl sulfate (TRADER Pro (a mixture with magnesium sulfate), manufactured by Comtorir Commercial Des Lubrifiants).

The phosphate surfactant may, for example, be a polyoxyethylene alkyl ether phosphate, a polyoxyethylene alkyl phenyl ether phosphate, a phosphoric acid ester of a polymer of a polyoxyethylene alkyl phenyl ether, a polyoxyethylene benzyl phenyl ether phosphate, a polyoxyethylene styryl phenyl ether phosphate, a phosphoric acid ester of a polymer of a polyoxyethylene styryl phenyl ether or a phosphoric acid ester of a polyoxyethylene polyoxypropylene block polymer, or a salt of such a phosphate.

Among them, preferred is a polyoxyethylene alkyl ether phosphate.

Specific examples of the phosphate surfactant include a polyoxyethylene C12-C15 alkyl ether phosphate (Phospholan PS-222, manufactured by AkzoNobel), polyoxyethylene lauryl ether diphosphate (PHOSPHANOL ML-220, manufactured by TOHO CHEMICAL INDUSTRY Co., Ltd.), polyoxyethylene lauryl ether tetraphosphate (PHOSPHANOL RD-510Y, manufactured by TOHO CHEMICAL INDUSTRY Co., Ltd.), polyoxyethylene tridecyl ether phosphate (PLYSURF A212C, manufactured by DKS Co., Ltd.).

Among them, preferred is a polyoxyethylene C12-C15 alkyl ether phosphate (Phospholan PS-22, manufactured AkzoNobel), polyoxyethylene lauryl ether diphosphate (PHOSPHANOL ML-220, manufactured by TOHO CHEMICAL INDUSTRY Co., Ltd.) or polyoxyethylene lauryl ether tetraphosphate (PHOSPHANOL RD-510Y, manufactured by TOHO CHEMICAL INDUSTRY Co., Ltd.).

Further, in the present invention, a mixture of the nonionic surfactant and the anionic surfactant may also be used. Specific examples of the surfactant according to such an embodiment include a mixture of polyoxyethylene nonyl phenyl ether, polyoxyethylene fatty acid ester and sodium polynaphthylmethanesulfonate (GRAMIN S, manufactured by Sankyo Chemicals Agro, Inc.).

The cationic surfactant is preferably at least one member selected from the group consisting of an ethoxylated aliphatic amine surfactant, a dialkylammonium salt surfactant and an alkylammonium salt surfactant.

Specific examples of the ethoxylated aliphatic amine surfactant include an ethoxylated fatty amine (Ethylan TT-15, manufactured by Akcros chemicals), tallow alkylamine ethoxylate (Genamin T-150, manufactured by Clariant), and tallow amine ethoxylate (Genamin T-200, manufactured by Clariant, Ethomeen T/25, manufactured by AkzoNobel).

Specific examples of the dialkylammonium salt surfactant include a dialkyldimethylammonium polynaphthylmethanesulfonate (NEEDS (a mixture with a polyoxyethylene fatty acid ester), manufactured by Kao Corporation), lauryl trimethylammonium chloride (CATIOGEN TML, manufactured by DKS Co., Ltd.) and lauryl dimethyl benzyl ammonium chloride (CATIOGEN BC-50, manufactured by DKS Co., Ltd.).

The vegetable oil is preferably at least one member selected from the group consisting of tall oil, coconut oil, soybean oil, rapeseed oil, corn oil, linseed oil, sunflower oil, cottonseed oil, esterated rapeseed oil, olive oil, castor oil, palm oil and avocado oil, more preferably at least one member selected from the group consisting of tall oil, tall oil fatty acid, soybean oil, methylated soybean oil, rapeseed oil, methylated rapeseed oil and methylated seed oil. Further, the vegetable oil includes extracts (e.g. glycerin and fatty acid) from vegetable oils, methylate vegetable oils and methylated seed oil.

Specific examples of the vegetable oil include tall oil (Prime Oil (a mixture with a polyoxyethylene alkyl phenyl ether and paraffin oil), manufactured by WINFIELD UNITED), tall oil fatty acid (ADwet90 (a mixture with a polyoxyethylene alkyl phenyl ether and diethylene glycol), manufactured by Simplot), methylated rapeseed oil (Tipo, manufactured by Belchim), purified soybean oil (Soy Oil Spray, manufactured by UNITED SUPPLIERS) and methylated seed oil (Dyne-Amic (a mixture with a polyoxyethylene dimethylsiloxane), manufactured by Helena).

Among them, preferred is tall oil (Prime Oil (a mixture with a polyoxyethylene alkyl phenyl ether and paraffin oil), manufacture by WINFIELD UNITED), tall oil fatty acid (ADwet90 (a mixture with a polyoxyethylene alkyl phenyl ether and diethylene glycol), manufactured by Simplot), methylated rapeseed oil (Tipo, manufactured by Belchim) or methylated seed oil (Dyne-Amic (a mixture with polyoxyethylene dimethylsiloxane), manufactured by Helena).

The paraffin is preferably at least one member selected from the group consisting of paraffin, petroleum, mineral oil, paraffin-based petroleum, paraffin-based mineral oil, paraffin oil, machine oil, spindle oil, naphtha, liquid paraffin and kerosene.

Among them, more preferred is at least one member selected from the group consisting of paraffin, paraffin-based petroleum, paraffin-based mineral oil or machine oil.

Specific examples of the paraffin include paraffin-based petroleum (Agridex (a mixture with a polyhydric alcohol fatty acid ester and a polyhydric alcohol polyethylene oxide fatty acid ester, manufactured by Bayer), paraffin-based mineral oil (Assist (a mixture with a surfactant), manufactured by BASF), paraffin oil (Prime Oil (a mixture with a polyoxyethylene alkyl phenyl ether and tall oil), manufactured by WINFIELD UNITED), paraffin (Petan V, manufactured by AGRO-KANESHO CO., LTD) and machine oil (RABISAN-SPRAY, manufactured by Nippon Soda Co., Ltd.).

Further, in the present invention, a mixture of a nonionic surfactant and a paraffin may also be used. Specific examples of such an embodiment include a mixture of paraffin-based petroleum, a polyhydric alcohol fatty acid ester and a polyhydric alcohol polyethylene oxide fatty acid ester (Agride, manufactured by Bayer). In the above mixture, the mixing ratio of the nonionic surfactant to the paraffin is, for example, by the weight ratio, from 1:100 to 100:1, preferably from 1:10 to 10:1.

The resin is preferably at least one member selected from the group consisting of an alkyd resin, a vinyl acetate resin and an acrylic resin. Among them, more preferred is an alkyd resin.

Specific examples of the resin include a phthalic acid-modified glycerol alkyd resin (Latron B-1956, manufactured by Simplot), a vinyl acetate resin emulsion (VINYBRAN 1035F6, manufactured by Nissin Chemical Industry Co., Ltd.) and an acrylic resin (VINYBRAN ADH71026, manufactured by Nissin Chemical Industry Co., Ltd.). Among them, preferred is a phthalic acid-modified galycerol alkyd resin (Latron B-19566, manufactured by Simplot).

The component (b) is preferably at least one component selected from the group consisting of a nonionic surfactant, an anionic surfactant, a vegetable oil, a paraffin oil and a resin. Specific examples thereof include a silicone surfactant, a polyoxyethylene surfactant, a polyhydric alcohol surfactant, an alkanolamide surfactant, a sulfonate surfactant, a phosphate surfactant, a vegetable oil, a paraffin and an alkyd resin.

The component (b) is more preferably at least one component selected from the group consisting of a nonionic surfactant and a paraffin, and as its specific example, at least one component selected from the group consisting of a silicone surfactant and a paraffin may be mentioned.

Specific examples of a preferred component (b) include polyether siloxane, polyoxyethylene dimethylsiloxane, polyoxyethylene methylpolysiloxane, polyalkylene oxide-modified polymethylsiloxane, polyoxyethylene propylheptamethyltrisiloxane, polyether-modified polysiloxane, hydroxypropyl heptamethyltrisiloxane, polyalkylene oxide-modified heptamethyltrisiloxane, a polyether/polymethylsiloxane copolymer, polyoxyethylene alkyl phenyl ether, polyoxyethylene nonyl phenyl ether, a polyoxyethylene C16-C18 fatty acid ester, a polyoxyethylene resinate, an alkylaryl polyoxyalkene ether, tall oil fatty acid methyl ester N,N-Bis2-omega-hydroxypolyoxyethylene alkylamine, sorbitan fatty acid ester, phthalic acid-modified glycerol alkyd resin, polyethylene glycol monooleate, polyethylene glycol monostearate, polyoxyethylene alkyl aryl sulfonate, polyoxyethylene C12-C15 alkyl ether phosphate, polyoxyethylene lauryl ether diphosphate, polyoxyethylene lauryl ether tetraphosphate, polyoxyethylene tridecyl ether phosphate, lauryl trimethylammonium chloride, tall oil, tall oil fatty acid, methylated rapeseed oil, methylated seed oil, paraffin, paraffin-based petroleum, paraffin-based mineral oil, paraffin oil, machine oil, polyhydric alcohol fatty acid ester and polyhydric alcohol polyethylene oxide fatty acid ester.

As a specific example of a more preferred component (b), at least one member selected from the group consisting of polyalkylene oxide-modified heptamethyltrisiloxane, paraffin-based mineral oil, polyhydric alcohol fatty acid ester and polyhydric alcohol polyethylene oxide fatty acid ester may be mentioned.

The enhancing method of the present invention is effective for controlling various plant disease, for example, diseases of Gramineae crops, such as rice diseases such as blast caused by *Magnaporthe grisea*, brown spot caused by *Cochliobolus miyabeanus*, and sheath blight caused by *Rhizoctonia solani*; wheat and barley diseases such as wheat and barley powdery mildew caused by *Erysiphe graminis*, Fusarium blight caused by *Fusarium* spp., rust caused by *Puccinia* spp., browning root rot caused by *Pythium* spp., loose smut caused by *Ustilago nuda*, eye spot caused by *Pseudocercosporella herpotrichoides*, and speckled leaf blotch or glume blotch caused by *Septoria* spp.; corn diseases such as leaf spot caused by *Phaeosphaeria* spp., rust caused by *Puccinia* spp., northern leaf blight caused by *Setosphaeria* spp., southern leaf blight caused by *Cochliobolus heterostrophus*, root rot caused by *Pythium graminicola*, and smut caused by *Ustilago maydis*; and sugar cane diseases such as smut caused by *Ustilago scitaminea*, leaf scorch caused by *Stagonospora* spp., rust caused by *Puccinia* spp., top rot caused by *Gibberella* spp., sooty mold caused by *Caldariomyces* spp., and leaf blight caused by *Pseudocercospora* spp.;

diseases of Legminosae crops, such as powdery mildew caused by *Oidium* spp., rust caused by *Phakopsora* spp., downy mildew caused by *Peronospora* spp., Phytophthora rot caused by *Phytophthora* spp., anthracnose caused by *Colletotrichum* spp., sclerotinia rot caused by *Sclerotinia* spp., and gray mold caused by *Botrytis* spp.;

diseases of Brassicaceae crops, such as downy mildew caused by *Peronospora* spp., and Alternaria leaf spot caused by *Alternaria* spp.;

diseases of Asteraceae crops, such as downy mildew caused by *Bremia* spp., blight caused by *Phytophthora* spp., gray mold caused by *Botrytis* spp., stem rot caused by *Sclerotinia* spp., and rust caused by *Aecidium*;

diseases of Solanaceae crops, such as tomato diseases such as early blight caused by *Alternaria solani*, leaf mold caused by *Fulvia fulva*, late blight caused by *Phytophthora infestans*, gray mold caused by *Botrytis cinerea*, and powdery mildew caused by *Oidiopsis sicula*; and potato diseases such as early blight caused by *Alternaria solani*, late blight caused by *Phytophthora infestans*, and Sclerotial rot caused by *Sclerotinia sclerotiorum*;

diseases of Cucurbitaceae crops, such as anthracnose caused by *Colletotrichum lagenarium*, powdery mildew caused by *Sphaerotheca* spp., gummy stem blight caused by *Didymella bryoniae*, downy mildew caused by *Pseudoperonospora cubensis*, phytophthora rot caused by *Phytophthora* spp., and Corynespora leaf spot caused by *Corynespora cassiicola*;

diseases of Allioideae crops, such as downy mildew caused by *Peronospora* spp., Phytophthora rot caused by *Phytophthora nicotianae*, gray mold caused by *Botrytis cinerea*, neck rot caused by *Sclerotinia* spp., and rust caused by *Puccinia* spp.;

diseases of Umbelliferae crops, such as leaf blight or Alternaria black rot caused by *Alternaria* spp., gray mold caused by *Botrytis cinerea*, Sclerotinia rot caused by *Sclerotinia* spp., powdery mildew caused by *Erysiphe heraclei*, and leaf spot caused by *Cercospora* spp.;

diseases of Liliaceae crops, such as Botrytis blight caused by *Botrytis* spp., blight caused by *Phytophthora* spp., and leaf blight caused by *Phomopsis* spp.;

diseases of Polygonaceae crops, such as downy mildew caused by *Peronospora* spp., powdery mildew caused by *Erysiphe polygoni*, and damping-off caused by *Rhizoctonia solani*;

diseases of Convolvulaceae crops, such as wilt caused by *Fusarium oxysporum*, black rot caused by *Ceratocystis fimbriata*, and soil rot caused by *Streptomyces ipomoeae*;

diseases of Chenopodiaceae crops, such as downy mildew caused by *Peronospora* spp., Phytophthora rot caused by *Phytophthora* spp., gray mold caused by *Botrytis cinerea*, root rot caused by *Sclerotinia sclerotiorum*, powdery mildew caused by *Oidium* spp., and Cercospora leaf spot caused by *Cercospora beticola*;

diseases of Vitaceae crops, such as bird's eye rot caused by *Elsinoe ampelina*, ripe rot caused by *Colletotrichum* spp., powdery mildew caused by *Erysiphe necator*, downy mildew caused by *Plasmopara viticola*, gray mold caused by *Botrytis cinerea*, Cercospora leaf spot caused by *Pseudocercospora* spp., and swelling arm caused by *Diaporthe kyushuensis*;

diseases of Rosaceae crops, such as strawberry diseases such as powdery mildew caused by *Sphaerotheca aphanis*, gray mold caused by *Botrytis cinerea*, and crown rot caused by *Glomerella cingulata*; apple diseases such as Monilia leaf blight caused by *Monilinia mali*, powdery mildew caused by *Podosphaera leucotricha*, Alternaria leaf spot caused by *Alternaria mali*, scab caused by *Venturia inaequalis*, bitter rot caused by *Glomerella cingulata*, blotch caused by *Diplocarpon mali*, ring rot caused by *Botryosphaeria kuwatsukai*, fly speck caused by *Zygophiala jamaicensis*, sooty blotch caused by *Gloeodes pomigena*, and fruit spot caused by *Mycosphaerella pomi*; Asian pear diseases such as scab caused by *Venturia* spp., black spot caused by *Alternaria* spp., powdery mildew caused by *Phyllactinia* spp., and Phytophthora crown and root rot caused by *Phytophthora cactorum*; and peach diseases such as brown rot caused by *Monilinia fructicola*, scab caused by *Cladosporium carpophilum*, and Phomopsis rot caused by *Phomopsis* spp.;

diseases of Rutaceae crops, such as melanoses caused by *Diaporthe citri*, and spot anthracnose caused by *Elsinoë fawcettii*;

diseases of Ebenaceae crops, such as anthracnose caused by *Colletotrichum gloeosporioides*, angular leaf spot caused by *Cercospora kaki*, powdery mildew caused by *Phyllactinia kakicola*, and fly speck caused by *Zygophiala jamaicensis*; and diseases of Theaceae crops, such as Anthracnose caused by *Colletotrichum* spp., gray blight caused by *Pestalotiopsis longiseta*, bacterial shoot blight caused by *Pseudomonas syringae*, and leaf and stem gall caused by *Exobasidium camelliae*.

The present invention is effective also for controlling various seed borne disease, for example, diseases of Gramineae crops, such as wheat diseases such as Fusarium blight caused by *Fusarium* spp., anthracnose caused by *Colletotrichum graminicola*, stinking smut caused by *Tilletia* spp., loose smut caused by *Ustilago* spp., Cephalosporium stripe caused by *Cephalosporium gramineum*, and glume blotch caused by *Septoria nodorum*; corn diseases such as southern leaf blight caused by *Bipolaris maydis*, anthracnose caused by *Colletotrichum draminicola*, and seedling blight caused by *Fusarium avenaceum*; and sugar cane diseases such as red rot caused by *Glomerella tucumanensis*, pineapple disease caused by *Ceratocystis paradoxa*, and downy mildew caused by *Sclerospora sacchari*;

diseases of Leguminosae crops, such as soybean diseases such as purple stain caused by *Cercospora kikuchii*, downy mildew caused by *Peronospora manshurica*, Fusarium blight caused by *Fusarium oxysporum*, Septoria brown spot caused by *Septoria glycines*, pod and stem blight caused by *Diaporthe phaseolorum*, anthracnose caused by *Colletotrichum truncatum*, and sleeping-blight caused by *Septogloeum sojae*;

diseases of Brassicaceae crops, such as cabbage diseases such as Alternaria leaf spot caused by *Alternaria brassicae*, alternaria sooty spot caused by *Alternaria brassicicola*, downy mildew caused by *Peronospora parasitica*, bacterial leaf spot caused by *Pseudomonas cannabina*, black rot caused by *Xanthomonas campestris*, and black leg caused by *Phoma lingam*; Japanese radish diseases such as alternaria leaf spot caused by *Alternaria brassicae*, yellows caused by *Fusarium oxysporum*, and black rot caused by *Xanthomonas campestris*; and Chinese cabbage diseases such as alternaria leaf spot caused by *Alternaria brassicae*, black rot caused by *Xanthomonas campestris*, and yellows caused by *Verticillium dahliae*;

diseases of Solanaceae crops, such as tomato diseases such as early blight caused by *Alternaria solani*, bacterial canker caused by *Clavibacter michiganensis*, and bacterial spot caused by *Xanthomonas vesicatoria*; eggplant diseases such as early blight caused by *Alternaria solani*, and brown spot caused by *Phomopsis vexans*; and potato diseases such as scab caused by *Streptomyces* spp., silver scurf caused by *Helminthosporium solani*, and powdery scab caused by *Spongospora subterranea*;

diseases of Cucurbitaceae crops, such as cucumber diseases such as leaf blight caused by *Alternaria alternata*, bacterial spot caused by *Pseudomonas syringae*, and bacterial brown spot caused by *Xanthomonas cucurbitae*;

diseases of Allioideae crops, such as onion diseases such as Alternaria leaf spot caused by *Alternaria porri*, gray mold neck rot or Mycelial neck rot caused by *Botrytis* spp., Fusarium basal rot caused by *Fusarium oxysporum*, and downy mildew caused by *Peronospora destructor*;

diseases of Umbelliferae crops, such as carrot diseases such as leaf blight or Alternaria black rot caused by *Alternaria* spp., and bacterial blight caused by *Xanthomonas hortorum*; and celery diseases such as late blight caused by *Septoria apiicola*, stem rot caused by *Sclerotinia sclerotiorum*, and bacterial leaf blight caused by *Pseudomonas syringae*; and diseases of Chenopodiaceae crops, such as spinach diseases such as downy mildew caused by *Peronospora farinosa*, Fusarium wilt caused by *Fusarium oxysporum*, and anthracnose caused by *Colletotrichum spinaciae*.

The present invention is effective also for controlling soil diseases caused by plant disease pathogens such as *Fusarium* spp., *Pythium* spp., *Rhizoctonia* spp., *Verticillium* spp., *Plasmodiophora* spp., and *Thielaviopsis* spp.

The plants to be protected from various plant disease pathogens by the present invention are not particularly limited so long as they are agriculturally useful. They may, for example, be Gramineae crops (such as rice, wheat, barley, oat, rye, corn and sugar cane), Leuminosae crops (such as soybean, kidney bean and adzuki bean), Brassicaceae crops (such as cabbage, Chinese cabbage, Japanese radish, turnip, broccoli, cauliflower, Turnip rape and rape), Asteraceae crops (such as lettuce, burdock and crown daisy), Solanaceae crops (such as potato, eggplant, tomato, sweet pepper and tobacco), Cucurbitaceae crops (such as cucumber, pumpkin, melon and watermelon), Allioideae crops (such as Welsh onion, Chinese chive, *Allium chinense* and garlic), Umbelliferae crops (such as celery, carrot and parsley), Liliaceae crops (such as lily, tulip and asparagus), Polygonaceae crops (such as buckwheat), Convolvulaceae crops (such as sweet potato), Chenopodiaceae crops (such as spinach and sugar beet), Vitaceae crops (such as grape), Rosaceae crops (such as rose, strawberry, apple, pear, peach, loquat and almond), Rutaceae crops (such as mandarin orange, lemon and orange), Ebenaceae crops (such as Japanese persimmon), Theaceae crops (such as tea), Oleaceae crops (such as olive and jasmine), Malvaceae crops (such as cotton, cacao and okra), Musaceae crops (such as banana), Zingiberaceae crops (such as ginger), Rubiaceae crops (such as coffee plant), and Bromeliaceae crops (such as pineapple and bananas).

So long as the purpose of the present invention can be accomplished, the component (a) and the component (b) of the present invention may be used as they are, or the component (b) may be added to the component (a) or, in the same manner as conventional agricultural chemicals, they may be mixed with various adjuvants and formulated into various formulations commonly used in this field such as a dust, granules, water dispersible granules, a wettable powder, a water-based suspension concentrate, an oil-based suspension concentrate, water soluble granules, an emulsifiable concentrate, a soluble concentrate, a paste, an aerosol and an ultra low-volume formulation.

When such a formulation is prepared, the component (a) and the component (b) of the present invention may be mixed and formulated together, or may be individually formulated.

Such adjuvants include solid carriers such as diatomaceous earth, slaked lime, calcium carbonate, talc, white carbon, kaoline, bentonite, a mixture of kaolinite and sericite, clay, sodium carbonate, sodium bicarbonate, mirabilite, zeolite and starch; solvents such as water, toluene, xylene, solvent naphtha, dioxane, acetone, isophorone, methyl isobutyl ketone, chlorobenzene, cyclohexane, dimethyl sulfoxide, dimethylformamide, dimethylacetamide, N-methyl-2-pyrrolidone and alcohol. Such adjuvants may be selected from those known in this field so long as the purpose of the present invention can thereby be accomplished. Further, various additives which are commonly used, such as a filler, a thickener, an anti-settling agent, an anti-freezing agent, a dispersion stabilizer, a phytotoxicity reducing agent, and an anti-mold agent, may also be employed. The blend ratio of the component (a) and the component (b) of the present invention to the various adjuvants is usually from 0.005:99.995 to 95:5, preferably from 0.2:99.8 to 90:10 by the weight ratio. In the actual application of such a formulation, it may be used as it is, or may be diluted to a predetermined concentration with a diluent such as water, and various spreaders may be added thereto, as the case requires.

Further, in the present invention, other agricultural chemicals such as a fungicide, an insecticide, a miticide, a nematicide, a soil insect pesticide, an antivirus agent, an attractant, a herbicide, a plant growth regulating agent and a microbial chemical, may be used in combination, whereby more excellent effects may sometimes be obtained.

The active ingredient compounds of a fungicide in the above-mentioned other agricultural chemicals may properly be selected, for example, from the following group of compounds (by common names or test codes of Japan Plant Protection Association). In a case where these compounds have their salts, alkyl esters, various structural isomers such as optical isomers, etc., all of them are included.

Anilinopyrimidine compounds such as mepanipyrim, pyrimethanil and cyprodinil;

pyridinamine compounds such as fluazinam;

triazolopyrimidine compounds such as 5-chloro-7-(4-methylpiperidin-1-yl)-6-(2,4,6-trifluorophenyl)[1,2,4]triazolo[1,5-a]pyrimidine, azole compounds such as triadimefon, bitertanol, triflumizole, etaconazole, propiconazole, penconazole, flusilazole, myclobutanil, cyproconazole, tebuconazole, hexaconazole, furconazole-cis, prochloraz, metconazole, epoxiconazole, tetraconazole, oxpoconazole fumarate, prothioconazole, triadimenol, flutriafol, difenoconazole, fluquinconazole, fenbuconazole, bromuconazole, diniconazole, tricyclazole, probenazole, simeconazole, pefurazoate, ipconazole, imibenconazole, azaconazole, triticonazole and imazalil;

quinoxaline compounds such as quinomethionate;

dithiocarbamate compounds such as maneb, zineb, mancozeb, polycarbamate, metiram, propineb and thiram;

organic chlorine compounds such as fthalide, chlorothalonil and quintozene;

imidazole compounds such as benomyl, carbendazim, thiabendazole and fuberiazole;

cyanoacetamide compounds such as cymoxanil;

anilide compounds such as metalaxyl, metalaxyl-M (another name: mefenoxam), oxadixyl, ofurace, benalaxyl, benalaxyl-M (another name: kiralaxyl, chiralaxyl), furalaxyl, cyprofuram, carboxin, oxycarboxin, thifluzamide, boscalid, bixafen, isotianil, tiadinil, sedaxane and pyraziflumid;

sulfamide compounds such as dichlofluanid;

copper compounds such as cupric hydroxide, oxine copper, anhydrous copper sulfate, copper nonylphenolsulfonate, copper 8-hydroxyquinoline and dodecylbenzenesulfonic acid bisethylenediamine copper(II) salt (another name: DBEDC);

organophosphorus compounds such as fosetyl-aluminum, tolclofos-methyl, edifenphos and iprobenfos;

phthalimide compounds such as captan, captafol and folpet;

dicarboxyimide compounds such as procymidone, iprodione and vinclozolin;

benzanilide compounds such as flutolanil, mepronil and benodanil;

amide compounds such as penthiopyrad, penflufen, furametpyr, isopyrazam, silthiopham, fenoxanil, fenfuram, fluxapyroxad, benzovindiflupyr and pydiflumetofen;

benzamide compounds such as fluopyram and zoxamide;

piperazine compounds such as triforine;

pyridine compounds such as pyrifenox and pyrisoxazole;

carbinol compounds such as fenarimol and nuarimol;

piperidine compounds such as fenpropidin;

morpholine compounds such as fenpropimorph and tridemorph;

organotin compounds such as fentin hydroxide and fentin acetate;

urea compounds such as pencycuron;

carboxylic acid amide compounds such as dimethomorph, flumorph, pyrimorph, iprovalicarb, benthiavalicarb-isopropyl, valifenalate and mandipropamid;

phenyl carbamate compounds such as diethofencarb;

cyanopyrrole compounds such as fludioxonil and fenpiclonil;

strobilurin compounds such as azoxystrobin, kresoximmethyl, metominostrobin, trifloxystrobin, picoxystrobin, oryzastrobin, dimoxystrobin, pyraclostrobin, fluoxastrobin, enestroburin, pyraoxystrobin, pyrametostrobin, coumoxystrobin, enoxastrobin, fenaminstrobin, flufenoxystrobin, triclopyricarb and mandestrobin; oxazolidinone compounds such as famoxadone;

thiazolecarboxamide compounds such as ethaboxam;

imidazolinone compounds such as fenamidone;

hydroxyanilide compounds such as fenhexamid;

sulfonamide compounds such as flusulfamide, amisulbrom and cyazofamid;

oxime ether compounds such as cyflufenamid;

anthraquinone compounds such as dithianon;

crotonic acid compounds such as meptyldinocap;

antibiotics such as validamycin, kasugamycin and polyoxins;

guanidine compounds such as iminoctadine and dodine;

quinoline compounds such as tebufloquin and quinoxyfen;

thiazolidine compounds such as flutianil;

carbamate compounds such as propamocarb hydrochloride, pyribencarb, tolprocarb and picarbutrazox;

aryl phenyl ketone compounds such as metrafenone and pyriofenone;

sulfur compounds such as sulfur and lime sulfur;

and other compounds such as isoprothiolane, pyroquilon, diclomezine, chloropicrin, dazomet, metam-sodium, nicobifen, diclocymet, proquinazid, fluopicolide, carpropamid, ferimzone, spiroxamine, fenpyrazamine, ametoctradin, oxathiapiprolin, dipymetitrone, SB-4303, BAF-1107, MIF-1002, KUF-1411, BAF-1120, BAF-1510, BAF-1511, NF-180, S-2399, SYJ-264, SYJ-259, AKD-5195, and BYF-1303.

Microbial fungicides include *Bacillus amyloliqefaciens* strain QST713, *Bacillus amyloliqefaciens* strain FZB24, *Bacillus amyloliqefaciens* strain MB1600, *Bacillus amyloliqefaciens* strain D747, *Pseudomonas fluorescens, Bacillus subtilis* and Trichoderma atroviride SKT-1.

Plant extracts include tea tree oil.

The active ingredient compounds of insect pest control agents, such as the insecticide, the miticide, the nematicide and the soil insect pesticide in the above-mentioned other agricultural chemicals, may properly be selected, for example, from the following group of compounds (by common names or test codes of Japan Plant Protection Association). In a case where these compounds have their salts, alkyl esters, various structural isomers such as optical isomers, etc., all of them are included, even if no specific disclosure thereof is made.

Organic phosphate compounds, such as profenofos, dichlorvos, fenamiphos, fenitrothion, EPN ((RS)-(O-ethyl O-4-nitrophenyl phenylphosphonothioate), diazinon, chlorpyrifos, chlorpyrifos-methyl, acephate, prothiofos, fosthiazate, cadusafos, disulfoton, isoxathion, isofenphos, ethion, etrimfos, quinalphos, dimethylvinphos, dimethoate, sulprofos, thiometon, vamidothion, pyraclofos, pyridaphenthion, pirimiphosmethyl, propaphos, phosalone, formothion, malathion, tetrachlorvinphos, chlorfenvinphos, cyanophos, trichlorfon, methidathion, phenthoate, oxydeprofos (another name: ESP), azinphos-methyl, fenthion, heptenophos, methoxychlor, parathion, phosphocarb, demeton-S-methyl, monocrotophos, methamidophos, imicyafos, parathionmethyl, terbufos, phosphamidon, phosmet and phorate;

carbamate compounds, such as carbaryl, propoxur, aldicarb, carbofuran, thiodicarb, methomyl, oxamyl, ethiofencarb, pirimicarb, fenobucarb, carbosulfan, benfuracarb, bendiocarb, furathiocarb, isoprocarb, metolcarb, xylylcarb, XMC (3,5-xylyl methylcarbamate) and fenothiocarb;

nereistoxin derivatives, such as cartap, thiocyclam, thiocyclam oxalate, thiocyclam hydrochloride, bensultap, thiosultap, monosultap (another name: thiosultapmonosodium), bisultap (another name: thiosultap-disodium) and polythialan;

organic metal compounds, such as fenbutatin oxide and cyhexatin;

pyrethroid compounds, such as fenvalerate, permethrin, cypermethrin, alpha-cypermethrin), zeta-cypermethrin, theta-cypermethrin, beta-cypermethrin, deltamethrin, cyhalothrin, gamma-cyhalothrin, lambda-cyhalothrin, tefluthrin, kappa-tefluthrin, ethofenprox, flufenprox, cyfluthrin, beta-cyfluthrin, fenpropathrin, flucythrinate, fluvalinate, cycloprothrin, pyrethrins, esfenvalerate, tetramethrin, resmethrin, protrifenbute, bifenthrin, kappa-bifenthrin, acrinathrin, allethrin, tau-fluvalinate, tralomethrin, profluthrin, metofluthrin, epsilon-metofluthrin, heptafluthrin, phenothrin, flumethrin, momfluorothrin, epsilon-momfluorothrin, silafluofen and chloroprallethrin;

benzoylurea compounds, such as diflubenzuron, chlorfluazuron, teflubenzuron, flufenoxuron, lufenuron, novaluron, triflumuron, hexaflumuron, bistrifluron, noviflumuron and fluazuron;

juvenile hormone-like compounds, such as methoprene, pyriproxyfen, fenoxycarb and diofenolan;

pyridazinone compounds, such as pyridaben;

pyrazole compounds, such as fenpyroximate, fipronil, tebufenpyrad, ethiprole, tolfenpyrad, acetoprole, pyrafluprole, pyriprole, cyenopyrafen, pyflubumide and flufiprole, neonicotinoid compounds, such as imidacloprid, nitenpyram, acetamiprid, thiacloprid, thiamethoxam, clothianidin, nidinotefuran, dinotefuran and nithiazine;

hydrazine compounds, such as tebufenozide, methoxyfenozide, chromafenozide and halofenozide;

pyridine compounds, such as pyridalyl and flonicamid;

cyclic keto-enol compounds, such as spirodiclofen, spiromesifen and spirotetramat;

strobilurin compounds, such as fluacrypyrim and pyriminostrobin;

pyrimidinamine compounds, such as flufenerim and pyrimidifen;

organic sulfur compounds, such as malathion;

triazine compounds, such as cyromazine;

hydrazone compounds, such as hydramethylnon;

diamide compounds, such as flubendiamide, chlorantraniliprole, cyantraniliprole, cyclaniliprole, tetraniliprole, broflanilide and cyhalodiamide;

thiourea compounds, such as diafenthiuron and chloromethiuron, formamidine compounds, such as amitraz, chlordimeform and chloromebuform, butenolide compounds such as flupyradifurone; and other compounds, such as buprofezin, hexythiazox, triazamate, pymetrozine, chlorfenapyr, indoxacarb, acequinocyl, etoxazole, 1,3-dichloropropene, benclothiaz, bifenazate, propargite, clofentezine, metaflumizone, cyflumetofen, pyrifluquinazone, fenazaquin, amidoflumet, sulfluramid, hydramethylnon, metaldehyde, sulfoxaflor, fluensulfone, verbutin, dicloromezotiaz, triflumezopyrim, fluhexafon, tioxazafen, afidopyropen, flometoquin, fluazaindolizine and fluxametamide.

Further, it may be mixed with or used in combination with microbial agricultural chemicals, such as insecticidal crystal proteins produced by *Bacillus thuringiensis aizawai, Bacillus thuringiensis kurstaki, Bacillus thuringiensis israelensis, Bacillus thuringiensis japonensis, Bacillus thuringiensis tenebrionis* or *Bacillus thuringiensis*, insect viruses, etomopathogenic fungi, and nematophagous fungi:

antibiotics or semisynthetic antibiotics, such as avermectin, emamectin benzoate, milbemectin, milbemycin, spinosad, ivermectin, lepimectin, abamectin, emamectin and spinetoram;

natural products, such as azadirachtin, rotenone, and ryanodine; and repellents, such as deet.

The formulation of the present invention or a diluted product thereof may be applied by a commonly used application method, such as spraying (such as spraying, jetting, misting, atomizing, powder or grain scattering, or dispersing in water), soil application (such as mixing or drenching), surface application (such as coating, powdering, smearing or covering) or seed treatment. Further, it may be applied also by a so-called ultra low-volume application method. In this method, the formulation may be composed of 100% of the active ingredients.

The application amounts of the component (a) and the component (b) as active ingredients of the present invention cannot generally be defined since they vary depending upon the conditions such as the plants to be treated, the application method, the type of the formulation, the dose and the application time. For example, in the case of foliar application, the total application amount of the active ingredients of the present invention is usually from 5 to 10,000 g/ha, preferably from 10 to 5,000 g/ha, more preferably from 100 to 2,500 g/ha. In the case of seed treatment, the total amount of the active ingredients of the present invention is usually from 1 to 2,000 g, preferably from 1 to 1,000 g, more preferably from 1 to 500 g per 100 kg of the seed weight. In the case of soil application, the total application amount of the active ingredients of the present invention is usually from 5 to 10,000 g/ha, preferably from 10 to 5,000 g/ha, more preferably from 100 to 1,000 g/ha.

The concentration of the active ingredients in the present invention cannot generally be defined since it varies depending upon the conditions such as the plants to be treated, the application method, the type of the formulation, the dose and the application time. For example, in the case of foliar application or soil application, the concentration is usually from 0.01 ppm to 100,000 ppm, preferably from 0.1 ppm to 10,000 ppm, more preferably from 1 ppm to 1,000 ppm. In the case of seed treatment, the concentration is usually from 0.25 to 500 g/100 kg seed, preferably from 10 to 200 g/100 kg seed.

The weight ratio of the component (a) to the component (b) is not particularly limited and may be adjusted within a relatively wide range depending upon the plants to be treated, the application site and the application method.

The weight ratio of the component (a) to the component (b) (component (a): component (b)) is usually from 1:10,000 to 10,000:1, preferably from 1:5,000 to 500:1, more preferably from 1:500 to 50:1, further preferably from 1:50 to 2:1.

In the method for enhancing controlling effects of the present invention, the content of the component (b) used is preferably from 0.0001 to 10%, more preferably from 0.001 to 5% by the wt % based on the entire liquid to be applied.

Preferred embodiments of the present invention will be described below.

(1) A method for enhancing plant disease controlling effects of isofetamid or its salt, which comprises using isofetamid or its salt as a component (a) and at least one component (b) selected from the group consisting of a nonionic surfactant, an anionic surfactant, a cationic surfactant, a vegetable oil, a paraffin and a resin.

(2) A method for controlling plant diseases, which comprises applying isofetamid or its salt as a component (a) and at least one component (b) selected from the group consisting of a nonionic surfactant, an anionic surfactant, a cationic surfactant, a vegetable oil, a paraffin and a resin to plants or to soil where they grow.

(3) The method according to (1) or (2), wherein the component (b) is at least one component selected from the group consisting of a nonionic surfactant and a paraffin.

(4) The method according to (1) or (2), wherein the component (b) is a nonionic surfactant.

(5) The method according to any one of (1) to (4), wherein the nonionic surfactant is at least one surfactant selected from the group consisting of a silicone surfactant, a polyoxyethylene surfactant, a polyhydric alcohol surfactant and an alkanolamide surfactant.

(6) The method according to any one of (1) to (4), wherein the nonionic surfactant is a silicone surfactant.

(7) The method according to (1) or (2), wherein the component (b) is an nonionic surfactant.

(8) The method according to (1), (2) or (7), wherein the anionic surfactant is at least one member selected from the group consisting of a sulfate surfactant, a sulfonate surfactant and a phosphate surfactant.

(9) The method according to (1) or (2), wherein the component (b) is a cationic surfactant.

(10) The method according to (1), (2) or (9), wherein the cationic surfactant is at least one member selected from the group consisting of an ethoxylated aliphatic amine surfactant, a dialkylammonium slat surfactant and an alkylammonium salt surfactant.

(11) The method according to (1) or (2), wherein the component (b) is a vegetable oil.

(12) The method according to (1), (2) or (11), wherein the vegetable oil is at least one member selected from the group consisting of tall oil, tall oil fatty acid, soybean oil, methylated soybean oil, rapeseed oil, methylated rapeseed oil and methylated seed oil.

(13) The method according to (1) or (2), wherein the component (b) is a paraffin.

(14) The method according to (1), (2), (3), (5), (6) or (13), wherein the paraffin is at least one member selected from the group consisting of paraffin, paraffin-based petroleum, paraffin-based mineral oil and machine oil.

(15) The method according to (1) or (2), wherein the component (b) is a resin.

(16) The method according to (1), (2) or (15), wherein the resin is at least one member selected from the group consisting of an alkyd resin, a vinyl acetate resin and an acrylic resin.

(17) The method according to any one of (1) to (16), wherein the weight ratio of the component (a) to the component (b) is from 1:5,000 to 500:1.

(18) The method according to any one of (1) to (16), wherein the weight ratio of the component (a) to the component (b) is from 1:500 to 50:1.

(19) The method according to any one of (1) to (16), wherein the weight ratio of the component (a) to the component (b) is from 1:50 to 2:1.

(20) A composition for controlling plant diseases, which comprises isofetamid or its salt as a component (a) and at least one component (b) selected from the group consisting of a nonionic surfactant, an anionic surfactant, a cationic surfactant, a vegetable oil, a paraffin and a resin, in a weight ratio of the component (a) to the component (b) of from 1:5,000 to 500:1.

(21) The composition according to (20), wherein the weight ratio of the component (a) to the component (b) is from 1:500 to 50:1.

(22) The composition according to (20), wherein the weight ratio of the component (a) to the component (b) is from 1:50 to 2:1.

(23) The composition according to (20), (21) or (22), wherein the component (b) is at least one member selected from the group consisting of a nonionic surfactant and a paraffin.

(24) The composition according to (20), (21) or (22), wherein the component (b) is a nonionic surfactant.

(25) The composition according to (23) or (24), wherein the nonionic surfactant is at least one surfactant selected from the group consisting of a silicone surfactant, a polyoxyethylene surfactant, a polyhydric alcohol surfactant and an alkanolamide surfactant.

(26) The composition according to (23) or (24), wherein the nonionic surfactant is a silicone surfactant.

(27) The composition according to (20), (21) or (22), wherein the component (b) is an anionic surfactant.

(28) The composition according to (27), wherein the anionic surfactant is at least one member selected from the group consisting of a sulfate surfactant, a sulfonate surfactant and a phosphate surfactant.

(29) The composition according to (20), (21) or (22), wherein the component (b) is a cationic surfactant.

(30) The composition according to (29), wherein the cationic surfactant is at least one member selected from the group consisting of an ethoxylated aliphatic amine surfactant, a dialkylammonium salt surfactant and an alkylammonium salt surfactant.

(31) The composition according to (20), (21) or (22), wherein the component (b) is a vegetable oil.

(32) The composition according to (31), wherein the vegetable oil is at least one member selected from the group consisting of tall oil, tall oil fatty acid, soybean oil, methylated soybean oil, rapeseed oil, methylated rapeseed oil and methylated seed oil.

(33) The composition according to (20), (21) or (22), wherein the component (b) is a paraffin.

(34) The composition according to (33), wherein the paraffin is at least one member selected from the group consisting of paraffin, paraffin-based petroleum, paraffin-based mineral oil and machine oil.

(35) The composition according to (20), (21) or (22), wherein the component (b) is a resin.

(36) The composition according to (35), wherein the resin is at least one member selected from the group consisting of an alkyd resin, a vinyl acetate resin and an acrylic resin.

EXAMPLES

Now, Test Examples of the present invention will be described, however, it should be understood that the present invention is by no means restricted to such Test Examples.

Test Example 1 (Test on Penetration Effect Against Cucumber Powdery Mildrew)

Cucumber (cultivar: Sagamihanjiro Fushinari) was cultivated in a polyethylene pot having a diameter of 7.5 cm, and when the cucumber reached 1.5-leaf stage, an isofetamid 400 ppm solution prepared by adding an aqueous solution (0.05 wt %) of each of products containing the component (b) as identified in Tables 1-1 to 1-6 to isofetamid, was applied to the leaf adaxial surface by means of a spray gun in an amount of 1,000 L/ha (20 ml/0.2 m$^2$). After the chemical solution dried, the cucumber was cultivated in a greenhouse for 4 days, the leaf abaxial surface was sprayed and inoculated with a suspension of conidia of *Sphaerotheca fulidinea*, and the cucumber was cultivated in a room at 22° C. under illumination for 7 to 8 days. The lesion area ratio on the abaxial surface of the first leaf was examined, and the control value was calculated based on the following formula. In Tables, "no addition" means the above treatment without adding the component (b) (the same applies hereinafter). The obtained results are shown in Tables 1-1 to 1-6.

Control value=$(1-a/b) \times 100$ a: lesion area ratio in treated plot, b: lesion area ratio in non-treated plot

TABLE 1-1

| Product (tradename) | Component (b) contained in product | Control value |
|---|---|---|
| Agridex | Paraffin-based petroleum | 90 |
| | Polyhydric alcohol fatty acid ester | |
| | Polyhydric alcohol polyethylene oxide fatty acid ester | |
| Assist | Paraffin-based mineral oil | 86 |
| Emulan PS700 | Polyoxyethylene C16-C18 fatty acid ester | 83 |
| KF-640 | Polyoxyethylene methylpolysiloxane | 86 |
| Masil SF19 | Polyoxyethylene propylheptamethyltrisiloxane | 100 |
| Prime Oil | Paraffin oil | 73 |
| | Polyoxyethylene alkyl phenyl ether | |
| | Tall oil | |
| Silwet L77 | Polyalkylene oxide-modified heptamethyltrisiloxane | 93 |
| No addition | | 0 |

TABLE 1-2

| Product (tradename) | Component (b) contained in product | Control value |
|---|---|---|
| Agridex | Paraffin-based petroleum Polyhydric alcohol fatty acid ester Polyhydric alcohol polyethylene oxide fatty acid ester | 97 |
| Assist | Paraffin-based mineral oil | 88 |
| Emulan PS700 | Polyoxyethylene C16-C18 fatty acid ester | 88 |
| Squash | Sorbitan fatty acid ester Polyoxyethylene resinate | 75 |
| Petan V | Paraffin | 100 |
| No addition | | 6 |

TABLE 1-3

| Product (tradename) | Component (b) contained in product | Control value |
|---|---|---|
| Break-Thru OE441 | Polyether siloxane | 80 |
| Nikkol MYO-10V | Polyethylene glycol monooleate | 85 |
| Phospholan PS-222 | Polyoxyethylene C12-C15 alkyl ether phosphate | 97 |
| PHOSPHANOL RD-510Y | Polyoxyethylene lauryl ether tetraphosphate | 82 |
| No addition | | 4 |

TABLE 1-4

| Product (tradename) | Component (b) contained in product | Control value |
|---|---|---|
| Emulan PS700 | Polyoxyethylene C16-C18 fatty acid ester | 100 |
| KF-640 | Polyoxyethylene methylpolysiloxane | 87 |
| Masil SF19 | Polyoxyethylene propylheptamethyltrisiloxane | 93 |
| Silwet L77 | Polyalkylene oxide-modified heptamethyltrisiloxane | 87 |
| Squash | Sorbitan fatty acid ester Polyoxyethylene resinate | 87 |
| Petan V | Paraffin | 93 |
| No addition | | 11 |

TABLE 1-5

| Product (tradename) | Component (b) contained in product | Control value |
|---|---|---|
| Cohere | Ethanolamine Triethanolamine Polyoxyethylene alkyl aryl sulfonate | 78 |
| Dyne-Amic | Polyoxyethylene dimethylsiloxane Methylated seed oil | 87 |
| Induce | Alkyl aryl polyoxyalkene ether | 73 |
| Kinetic | Polyalkylene oxide-modified polymethylsiloxane | 96 |
| Latron B-1956 | Phthalic acid-modified glycerol alkyd resin | 73 |
| Quark | Polyether-modified polysiloxane | 96 |
| R-11 | Polyoxyethylene nonylphenol | 96 |
| Silglow | Hydroxypropyl heptamethyltrisiloxane | 96 |
| Silwet L77 | Polyalkylene oxide-modified heptamethyltrisiloxane | 100 |
| Syl-Coat | Polyether/polymethylsiloxane copolymer | 96 |
| No addition | | 14 |

TABLE 1-6

| Product (tradename) | Component (b) contained in product | Control value |
|---|---|---|
| ADwet90 | Polyoxyethylene alkyl phenyl ether Tall oil fatty acid | 94 |

TABLE 1-6-continued

| Product (tradename) | Component (b) contained in product | Control value |
|---|---|---|
| Cohere | Ethanolamine Triethanolamine Polyoxyethylene alkyl aryl sulfonate | 84 |
| Dyne-Amic | Polyoxyethylene dimethylsiloxane Methylated seed oil | 81 |
| Entry | Tall oil fatty acid methyl ester N,N-Bis2-omega-hydroxypolyethylene alkylamine | 90 |
| Induce | Alkyl aryl polyoxyalkene ether | 94 |
| Kinetic | Polyalkylene oxide-modified polymethylsiloxane | 100 |
| Latron B-1956 | Phthalic acid-modified glycerol alkyd resin | 94 |
| Quark | Polyether-modified polysiloxane | 100 |
| R-11 | Polyoxyethylene nonylphenol | 100 |
| Silglow | Hydroxypropyl heptamethyltrisiloxane | 97 |
| Silwet L77 | Polyalkylene oxide-modified heptamethyltrisiloxane | 100 |
| Syl-Coat | Polyether/polymethylsiloxane copolymer | 100 |
| No addition | | 68 |

Test Example 2 (Test on Penetration Effect Against Cucumber Leaf Spot)

Cucumber (cultivar: Natsusuzumi) was cultivated in a polyethylene pot having a diameter of 7.5 cm, and when the cucumber reached 1.5-leaf stage, an isofetamid 400 ppm solution prepared by adding an aqueous solution (0.05 wt %) of each of products containing the component (b) as identified in Table 2 to isofetamid, was applied to the leaf adaxial surface by means of a spray gun in an amount corresponding to 1,000 L/ha. The cucumber was cultivated in a greenhouse for 4 days, and the leaf abaxial surface was sprayed and inoculated with a suspension of conidia of *Corynesbora cassiicora*, and the cucumber was kept under humidified chamber conditions at 23° C. for 24 hours. Thereafter, the cucumber was kept in a thermostatic chamber at 20° C., and 7 days after the inoculation, the lesion area ratio on the first leaf was examined, and the control value was calculated based on the following formula. The obtained results are shown in Table 2.

Control value=$(1-a/b) \times 100$ a: lesion area ratio in treated plot, b: lesion area ratio in non-treated plot

TABLE 2

| Product (tradename) | Component (b) contained in product | Control value |
|---|---|---|
| ADwet90 | Polyoxyethylene alkyl phenyl ether Tall oil fatty acid | 99 |
| Agridex | Paraffin-based petroleum Polyhydric alcohol fatty acid ester Polyhydric alcohol polyethylene oxide fatty acid ester | 100 |
| Assist | Paraffin-based mineral oil | 100 |
| BreakThru OE441 | Polyether siloxane | 84 |
| Cohere | Ethanolamine Triethanolamine Polyoxyethylene alkyl aryl sulfonate | 99 |
| Dyne-Amic | Polyoxyethylene dimethylsiloxane Methylated seed oil | 100 |
| Emulan PS700 | Polyoxyethylene C16-C18 fatty acid ester | 100 |
| Entry | Tall oil fatty acid methyl ester N,N-Bis2-omega-hydroxypolyoxyethylene alkylamine | 97 |
| Induce | Alkyl aryl polyoxyalkene ether | 99 |
| Kinetic | Polyalkylene oxide-modified polymethylsiloxane | 89 |

TABLE 2-continued

| Product (tradename) | Component (b) contained in product | Control value |
|---|---|---|
| Latron B-1956 | Phthalic acid-modified glycerol alkyd resin | 97 |
| Masil SF19 | Polyoxyethylene propylheptamethyltrisiloxane | 100 |
| Nikkol MYO-10V | Polyethylene glycol monooleate | 99 |
| Phospholan PS-222 | Polyoxyethylene C12-C15 alkyl ether phosphate | 99 |
| Prime Oil | Paraffin oil Polyoxyethylene alkyl phenyl ether Tall oil | 100 |
| Quark | Polyether-modified polysiloxane | 99 |
| R-11 | Polyoxyethylene nonylphenol | 99 |
| Silglow | Hydroxypropyl heptamethyltrisiloxane | 95 |
| Silwet L77 | Polyalkylene oxide-modified heptamethyltrisiloxane | 92 |
| Syl-Coat | Polyether/polymethylsiloxane copolymer | 97 |
| Squash | Sorbitan fatty acid ester Polyoxyethylene resinate | 97 |
| PHOSPHANOL ML-220 | Polyoxyethylene lauryl ether diphosphate | 100 |
| PHOSPHANOL RD-510Y | Polyoxyethylene lauryl ether tetraphosphate | 100 |
| Petan V | Paraffin | 100 |
| No addition | | 68 |

Test Example 3 (Test on Curative Effect Against Cucumber Leaf Spot)

Cucumber (cultivar: Natsusuzumi) was cultivated in a polyethylene pot having a diameter of 7.5 cm, and when the cucumber reached 1.5-leaf stage, the leaf adaxial surface was sprayed and inoculated with a suspension of conidia of *Corynesbora cassiicora*, and the cucumber was kept under humidified chamber conditions at 23° C. for 24 hours. The leaf was air-dried, and an isofetamid 400 ppm solution prepared by adding an aqueous solution (0.05 wt %) of each of products containing the component (b) as identified in Table 3 to isofetamid, was applied by means of a spray gun in an amount corresponding to 1,000 L/ha. Thereafter, the cucumber was kept in a thermostatic chamber at 20° C., and 7 days after the inoculation, the lesion area ratio on the first leaf was examined, and the control value was calculated based on a following formula. The obtained results are shown in Table 3.

Control value=$(1-a/b) \times 100$ a: lesion area ratio in treated plot, b: lesion area ratio in non-treated plot

TABLE 3

| Product (tradename) | Component (b) contained in product | Control value |
|---|---|---|
| Agridex | Paraffin-based petroleum Polyhydric alcohol fatty acid ester Polyhydric alcohol polyethylene oxide fatty acid ester | 83 |
| Assist | Paraffin-based mineral oil | 83 |
| Emulan PS700 | Polyoxyethylene C16-C18 fatty acid ester | 50 |
| Nikkol MYS-55V | Polyethylene glycol monostearate | 67 |
| Prime Oil | Paraffin oil Polyoxyethylene alkyl phenyl ether Tall oil | 83 |
| Squash | Sorbitan fatty acid ester Polyoxyethylene resinate | 67 |
| PHOSPHANOL RD-510Y | Polyoxyethylene lauryl ether tetraphosphate | 83 |
| PLYSURF A212C | Polyoxyethylene tridecyl ether phosphate | 92 |

TABLE 3-continued

| Product (tradename) | Component (b) contained in product | Control value |
|---|---|---|
| Petan V | Paraffin | 98 |
| RABISAN-SPRAY | Machine oil | 92 |
| No addition | | 0 |

Test Example 4: (Test on Rainfastness Against Cucumber Powdery Mildew)

Cucumber (cultivar: Sagamihanjiro Fushinari) was cultivated in a polyethylene pot having a diameter of 7.5 cm, and when the cucumber reached 1.5-leaf stage, an isofetamid 200 ppm solution prepared with an aqueous solution (0.05 wt %) of each of products containing the component (b) as identified in Table 4 was applied to the leaf adaxial surface by means of a spray gun in an amount of 1,000 L/ha (20 ml/0.2 m$^2$). After the chemical solution dried, the cucumber was cultivated in a greenhouse for 2 days, and rainfall treatment (rainfall intensity: 40 mm per hour) was carried out by means of an artificial rainfall apparatus for one hour, and after drying, the leaf adaxial surface was sprayed and inoculated with a suspension of conidia of *Sphaerotheca fulidinea*, and the cucumber was cultivated in a room at 20° C. under illumination for 7 days. The lesion area ratio on the adaxial surface of the first leaf was examined, and the control value was calculated based on the following formula. The obtained results are shown in Table 4.

Control value=$(1-a/b) \times 100$ a: lesion area ratio in treated plot, b: lesion area ratio in non-treated plot

TABLE 4

| Product (tradename) | Component (b) contained in product | Control value |
|---|---|---|
| Agridex | Paraffin-based petroleum Polyhydric alcohol fatty acid ester Polyhydric alcohol polyethylene oxide fatty acid ester | 94 |
| Emulan PS700 | Polyoxyethylene C16-C18 fatty acid ester | 94 |
| Phospholan PS-222 | Polyoxyethylene C12-C15 alkyl ether phosphate | 97 |
| Quark | Polyether-modified polysiloxane | 81 |
| Silwet L77 | Polyalkylene oxide-modified heptamethyltrisiloxane | 90 |
| Syl-Coat | Polyether/polymethylsiloxane copolymer | 81 |
| Petan V | Paraffin | 97 |
| No addition | | 62 |

Test Example 5 (Test on Penetration Effect Against Cucumber Leaf Spot with Different Surfactant Concentrations)

Cucumber (cultivar: Natsusuzumi) was cultivated in a polyethylene pot having a diameter of 7.5 cm, and when the cucumber reached 1.5-leaf stage, an isofetamid 200 ppm solution prepared by adding an aqueous solution (0.02 to 1.0 wt %) of each of products to isofetamid was applied to the leaf adaxial surface by means of a spray gun in an amount corresponding to 1,000 L/ha. The cucumber was cultivated in a greenhouse for 3 days, and the leaf abaxial side was sprayed and inoculated with a suspension of conidia of *Corynespora cassiicora*, and the cucumber was kept under humidified chamber conditions at 23° C. for 24 hours.

Thereafter, the cucumber was kept in a thermostatic chamber at 20° C., and 7 days after the inoculation, the lesion area ratio on the first leaf was examined, and the control value was calculated based on the following formula. The obtained results are shown in Table 5.

Control value=(1−a/b)×100 a: lesion area ratio in treated plot, b: lesion area ratio in non-treated plot

TABLE 5

| Product (tradename) | Concentration (wt %) | Component (b) contained in product | Control value |
|---|---|---|---|
| Agridex | 1.0% | Paraffin-based petroleum | 100 |
|  | 0.5% | Polyhydric alcohol fatty acid ester Polyhydric alcohol polyethylene oxide fatty acid ester | 100 |
| Assist | 0.125% | Paraffin-based mineral oil | 100 |
| Silwet L77 | 0.025% | Polyalkylene oxide-modified heptamethyltrisiloxane | 100 |
| ADwet90 | 0.06% | Polyoxyethylene alkyl phenyl ether | 100 |
|  | 0.02% | Tall oil fatty acid | 100 |
| Tipo | 0.5% | Methylated rapeseed oil | 98.9 |
|  | 0.125% |  | 100 |
| No addition |  |  | 66.7 |

Test Example 6 (Test on Penetration Effect Against Cucumber Powdery Mildew)

Cucumber (cultivar: Sagamihanjiro Fushinari) was cultivated in a polyethylene pot having a diameter of 7.5 cm, and when the cucumber reached 1.5-leaf stage, an isofetamid 400 ppm solution prepared by adding an aqueous solution (0.025 wt %) of each of products containing the component (b) as identified in Table 6 to isofetamid was applied to the leaf adaxial surface by means of a spray gun in an amount corresponding to 1,000 L/ha. The cucumber was cultivated in a greenhouse for 4 days, and then the leaf abaxial side was sprayed and inoculated with a suspension of conidia of Sphaerotheca fulidinea, and the cucumber was cultivated in a room at 22° C. under illumination for 7 days. The lesion area ratio on the abaxial side of the first leaf was examined, and the control value was calculated based on the following formula. The obtained results are shown in Table 6.

Control value=(1−a/b)×100 a: lesion area ratio in treated plot, b: lesion area ratio in non-treated plot

TABLE 6

| Product (tradename) | Component (b) contained in product | Control value |
|---|---|---|
| CATIOGEN TML | Lauryl trimethylammonium chloride | 88.2 |
| CATIOGEN BC-50 | Lauryl dimethyl benzyl ammonium chloride | 95.7 |
| No addition |  | 54.6 |

Test Example 7 (Test on Residual Effect Against Cucumber Leaf Spot)

Cucumber (cultivar: Natsusuzumi) was cultivated in a polyethylene pot having a diameter of 7.5 cm, and when the cucumber reached four-leaf stage, an isofetamid 200 ppm solution prepared by adding 0.05 wt % of each of products containing the component (b) as identified in Table 7 to an isofetamid diluent, was applied to the leaf adaxial surface by means of a spray gun in an amount corresponding to 1,000 L/ha. After the chemical solution dried, the cucumber was cultivated in a greenhouse for 7 days, and the cucumber was sprayed and inoculated with a suspension of conidia of Corynespora cassiicora, and kept under humidified chamber conditions at 23° C. for 24 hours. Thereafter, the cucumber was cultivated in a room at 20° C. under illumination for 7 days. The lesion area ratio on the first leaf was examined, and the control value was calculated based on the following formula. The obtained results are shown in Table 7.

Control value=(1−a/b)×100 a: lesion area ratio in treated plot, b: lesion area ratio in non-treated plot

TABLE 7

| Product (tradename) | Component (b) contained in product | Control value |
|---|---|---|
| Assist | Paraffin-based mineral oil | 95 |
| PHOSPHANOL RD-510Y | Polyoxyethylene lauryl ether tetraphosphate | 100 |
| PLYSURF A212C | Polyoxyethylene tridecyl ether phosphate | 100 |
| No addition |  | 80 |

INDUSTRIAL APPLICABILITY

The method for controlling plant diseases of the present invention has stably high controlling effects against plant diseases and is thereby useful for controlling plant diseases.

The entire disclosure of Japanese Patent Application No. 2016-043197 filed on Mar. 7, 2016 including specification, claims, drawings and summary is incorporated herein by reference in its entirety.

What is claimed is:

1. A method for enhancing plant disease controlling effects of isofetamid or its salt, which comprises using isofetamid or its salt as a component (a) and a surfactant as a component (b), wherein a weight ratio of the component (a) to the component (b) is from 1:500 to 50:1; wherein the surfactant is polyalkylene oxide-modified heptamethyltrisiloxane; and wherein the plant disease is selected from powdery mildew caused by Sphaerotheca spp., Corynespora leaf spot caused by Corynespora spp., Alternaria leaf spot caused by Alternaria spp., gray mold caused by Botrytis spp., and scab caused by Venturia spp.

2. The method according to claim 1, wherein the component (b) further comprises at least one component selected from the group consisting of an anionic surfactant, a cationic surfactant, a vegetable oil, a paraffin, and a resin.

3. A composition for controlling powdery mildew caused by Sphaerotheca spp., Corynespora leaf spot caused by Corynespora spp., Alternaria leaf spot caused by Alternaria spp., gray mold caused by Botrytis spp., and scab caused by Venturia spp., which comprises isofetamid or its salt as a component (a) and a surfactant as a component (b), in a weight ratio of the component (a) to the component (b) of from 1:500 to 50:1, wherein the surfactant is polyalkylene oxide-modified heptamethyltrisiloxane.

4. A method for enhancing plant disease controlling effects of isofetamid or its salt, which comprises using isofetamid or its salt as a component (a) and a paraffin-based mineral oil as a component (b), wherein a weight ratio of the component (a) to the component (b) is from 1:6.25 to 1:1.25;

and wherein the plant disease is selected from powdery mildew caused by *Sphaerotheca* spp., *Corynespora* leaf spot caused by *Corynespora* spp., and gray mold caused by *Botrytis* spp.

5. A method for controlling plant diseases, which comprises applying isofetamid or its salt as a component (a) and methylated rapeseed oil as a component (b), to plants or to soil where they grow, wherein a weight ratio of the component (a) to the component (b) is from 1:25 to 1:1.25; and wherein the plant disease is selected from *Corynespora* leaf spot caused by *Corynespora* spp. and gray mold caused by *Botrytis* spp.

6. A method for controlling plant diseases, which comprises applying isofetamid or its salt as a component (a) and a mixture comprising paraffin-based petroleum, polyhydric alcohol fatty acid ester, and polyhydric alcohol polyethylene oxide fatty acid ester as a component (b), to plants or to soil where they grow, wherein a weight ratio of the component (a) to the component (b) is from 1:50 to 1:1.25; and wherein the plant disease is selected from *Corynespora* leaf spot caused by *Corynespora* spp., powdery mildew caused by Sphaerotheca spp., and gray mold caused by *Botrytis* spp.

\* \* \* \* \*